United States Patent
Fan

[19]

[11] Patent Number: 5,592,066
[45] Date of Patent: Jan. 7, 1997

[54] MOBILE PHONE RECHARGER

[76] Inventor: Eagle Fan, No. 30, Lu-Chang, Chu-Pei City, Hsin-Chu Hsien, Taiwan

[21] Appl. No.: 559,845

[22] Filed: Nov. 20, 1995

[51] Int. Cl.⁶ .................. H02J 7/00; F21L 7/00
[52] U.S. Cl. .............. 320/2; 362/190; 362/191; 320/15
[58] Field of Search ............... 320/2, 15; 362/190–191, 362/194, 195, 183, 388, 391, 396, 418, 430

[56] References Cited

U.S. PATENT DOCUMENTS

| | | | |
|---|---|---|---|
| 4,058,719 | 11/1977 | Chopp | 362/190 |
| 4,208,703 | 6/1980 | Orr | 362/190 X |
| 4,399,498 | 8/1983 | Bacevius | 362/190 X |
| 4,467,263 | 8/1984 | Conforti et al. | 320/2 |
| 4,881,155 | 11/1989 | Gahagan | 362/191 |
| 5,001,772 | 3/1991 | Holcomb et al. | 320/2 X |
| 5,010,454 | 4/1991 | Hopper | 362/191 X |
| 5,142,458 | 8/1992 | Brunson | 362/194 |
| 5,223,780 | 6/1993 | Hu | 320/2 X |

*Primary Examiner*—Stuart N. Hecker
*Assistant Examiner*—K. Shin

[57] ABSTRACT

A mobile phone recharger having a battery seat on the top surface, a light source pivotally connected to the front, and a clipping means on the back surface, is able to detect the power status of the battery and with the help of the illumination of the light source, the remaining power in the battery is consumed. The clipping structure enables the recharger to be hung by a hook (or the same) on the wall, therefore, the recharger is used as an emergency flash light.

3 Claims, 5 Drawing Sheets

MOBILE PHONE RECHARGER

FIELD OF THE PRESENT INVENTION

The invention relates generally to a mobile phone recharger and in particular to a mobile phone recharger that incorporates a flash light to serve as a night source in a dark environment and to consume residual power of the rechargeable battery for performing a better charging theory.

BACKGROUND OF THE INVENTION

Nowadays, the battery of a mobile phone, because of the advanced technology, is available to provide the mobile phone to be in the mode of "standby" for almost 24 hours, and it also can continuously provide the power for the mobile phone in use for 3 to 4 hours. Therefore, we understand that a good battery is the most important factor affecting the efficiency of a mobile phone. Yet, when speaking about the battery used for a mobile phone, we must also understand that the power of the battery will gradually die out when the times of usage of a mobile phone increases. Based on the reason, having a good recharger for the battery to recharge the power is also very important for the people who use mobile phone a lot. But the proper way to charge a battery is first to make sure that there is not any power left in the battery, and then put the battery on the charger to proceed the charging procedure. When the power of the battery of a mobile phone is down, people usually put the battery in the recharger to recharge the power without checking if there is any power left in the battery. This usually will affect the life span of the battery seriously. As to the recharger having a discharge circuit designed therein, is somewhat too big in size to be carried along and sometimes, occupy a large space.

In a dark night, what if your car suddenly broke down, and there is not any light source at hand, or the light source is mounted on something and is not easy to move around as you try to locate the spot which is out of order?

To solve such an inconvenient problems, it would be advisable to provide a multi-function mobile phone recharger having a space on the top of the recharger for storing the battery therein, an adjustable light source at one end of the recharger, and a clipping means mounted on the back of the recharger with an adjustable supporting frame attached thereto.

SUMMARY OF THE INVENTION

It is therefor an object of the present invention to provide a mobile phone recharger having a light source at one end, which can judge the efficiency of the battery by the brightness of the light, and provide a discharge to the power of the battery, if there is any.

Another object of the present invention is to provide a mobile phone recharger which can be used as a flash light when in emergency. After the battery is put into the proper space, the recharger incorporating with the clipping means on its back is easy to hang on things and ready to be used, or with the help of the adjustable supporting frame, the recharger having an adjustable light source at one end is very easy to be fixed at any places where the users wanted.

Still another object of the present invention is to provide a mobile phone recharger whose battery space can be used as a spare-battery storing place, which can not only minimizes the space required for the second battery, but also can be transferred into a "portable flash light" or "battery storing place".

Another object of the present invention is to provide a mobile phone recharger having on its back an adjusting supporting frame. With the help of the adjusting supporting frame, the mobile phone recharger stands on a level surface as shown in FIG. 4, which can be used as an ordinary light source on the desk.

Still another object of the present invention is to provide a mobile phone recharger with the characteristics of low price, easy to operate and functions other than recharge.

The present invention as will be disclosed by the accompanying drawings and description is not to limit the scope or spirit of the invention. They are merely described as preferred embodiments of the present invention.

BRIEF DESCRIPTION OF THE DRAWINGS

Reference is now made to the accompanying drawings, in which it is shown an illustrative embodiment of the present invention from which its novel features and advantages will be apparent, wherein.

DETAILED DESCRIPTION OF THE PREFERRED EMBODIMENT

Figure 1:
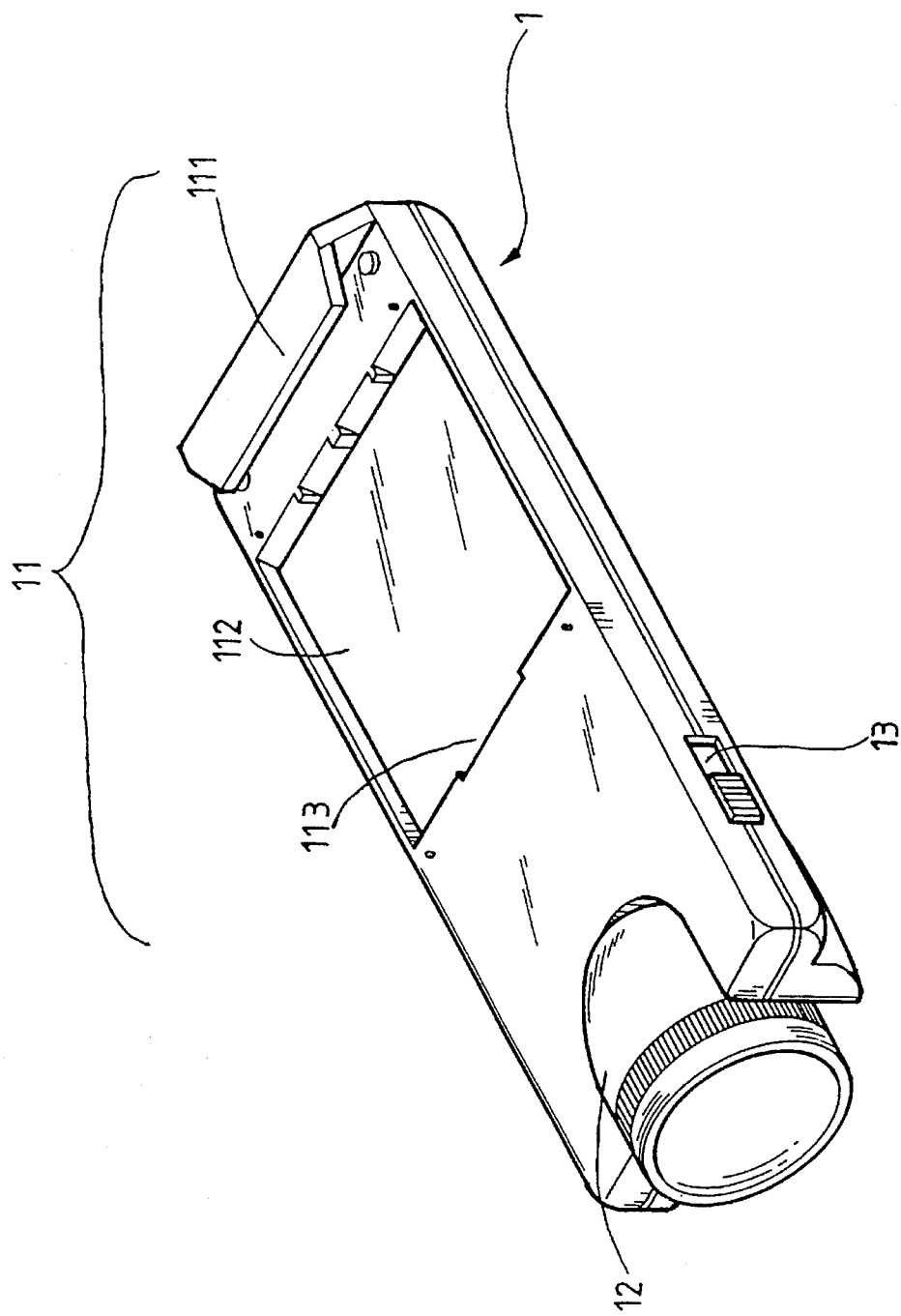
FIG. 1 is a perspective view of a mobile phone recharger constructed in accordance with the present invention.

With reference to the drawings, and in particular to FIG. 1, wherein a perspective view of a mobile phone recharger 1 constructed in accordance with the present invention is shown, the mobile phone recharger 1 has, formed on a top side thereof, a battery seat 11 constructed in accordance with the type of the battery used, whose preferred which shape as shown in FIG. 1 is constructed based on ERICSSON 237/337 battery. It is, however, understood that the battery seat 11 can be modified to suit other types of rechargeable batteries. To firmly secure the battery within the seat 11, a blocking plate 111, a concave portion 112 and a recess 113 are formed at the rear end and the center of the seat 11 respectively. On one side of the rear part of the recharger 1, a socket (not shown) is formed for connecting with an external power source.

Figure 2:
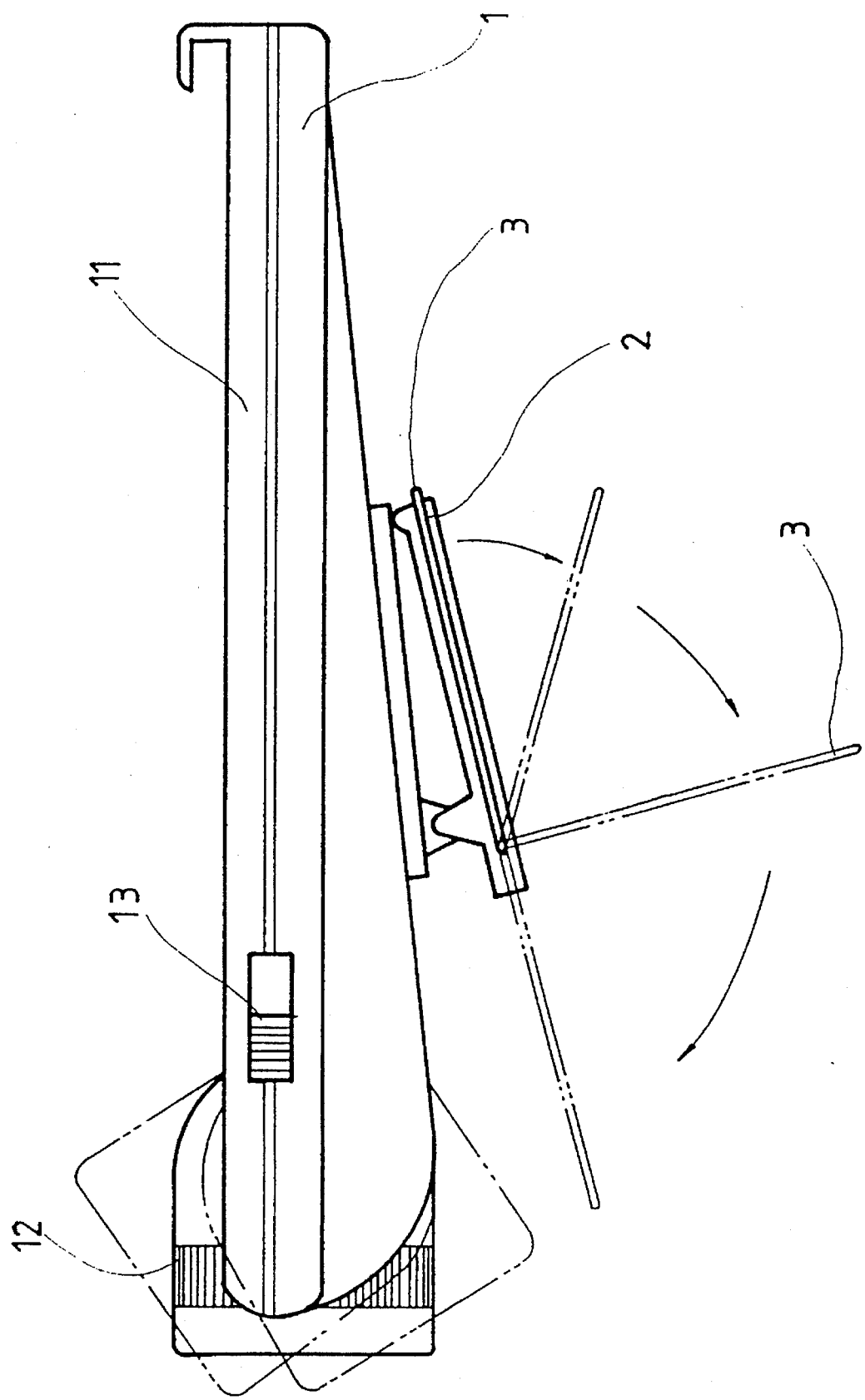
FIG. 2 is a side view of the present invention.

As shown is FIG. 2, wherein an adjustable light source 12, such as a flash light, is pivotally connected at the front end of the mobile phone recharger 1, and clipping means 2, a supporting frame 3 and a switch 13 are formed at the back and the side of the recharger 1 respectively. The power required by the light source 12 is provided by the battery in the seat 11 via connectors (not shown), and by observing the brightness of the light, it is obvious to know the power status of the batter. If it is found that there is some power left in the battery after the mobile phone has been used for several times, right before recharging the battery, it will be very convenient and easy to turn on the switch 13 on the side of the recharger 1, and the power left in the battery will be consumed through the illumination of the light source 12. Thus the life span of the battery can be extended as long as it designed.

Figure 3:
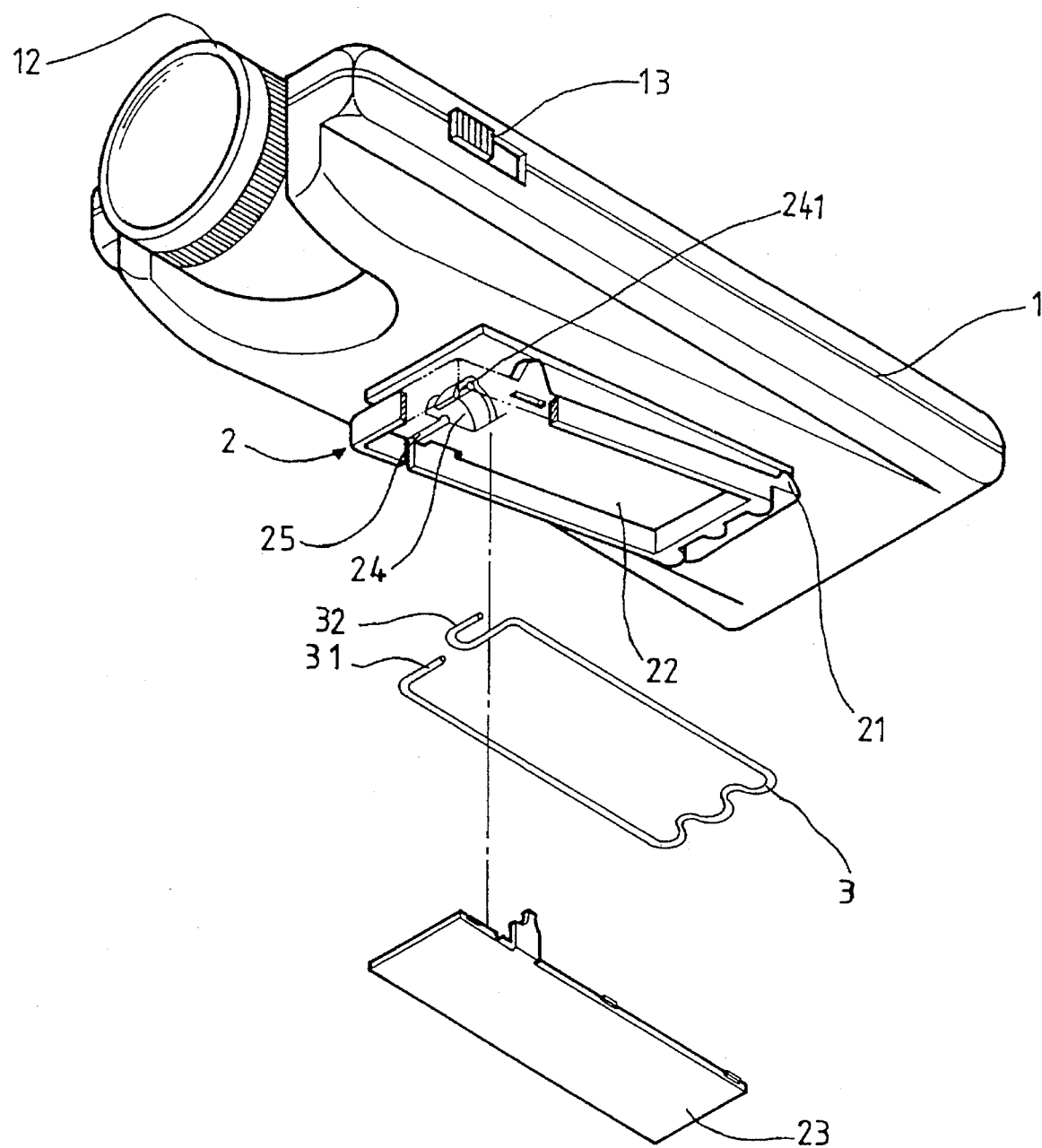
FIG. 3 is an exploded perspective view of the clipping means.
Figure 4:
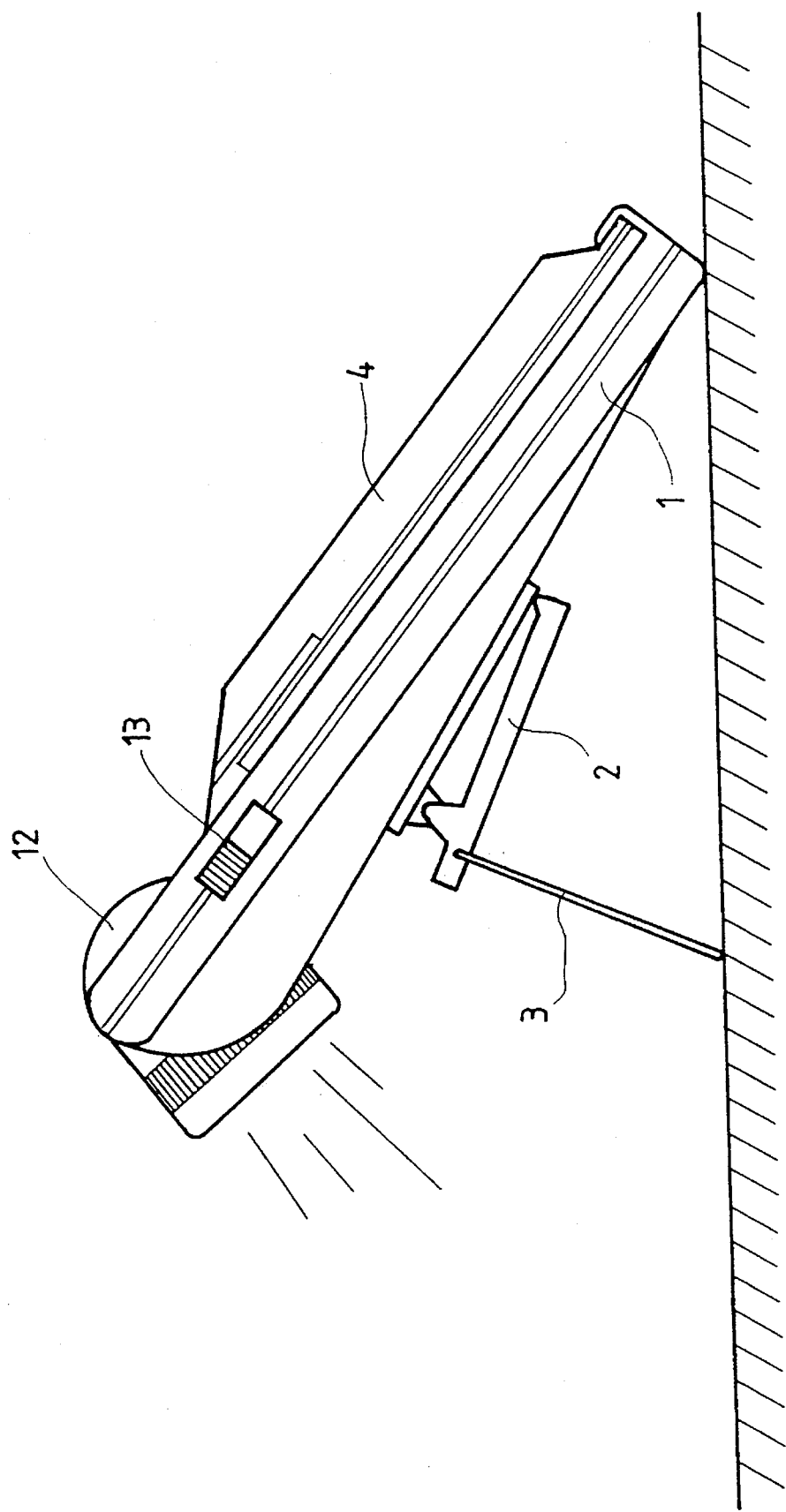
FIG. 4 is one embodiment of the present invention as a light source on a level surface.
Figure 5:
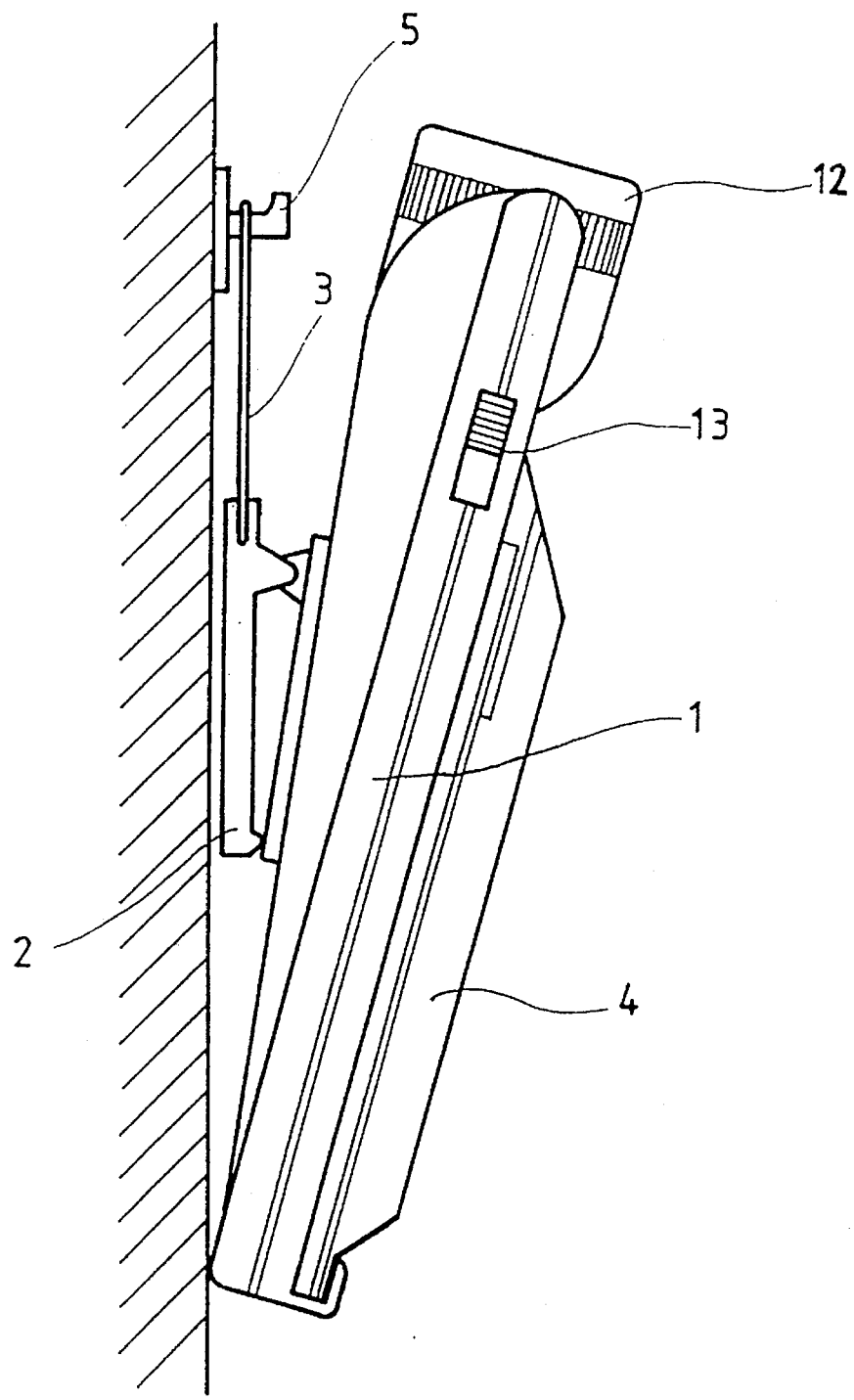
FIG. 5 is another embodiment of the present invention.

Referring again to FIGS. 2, and 3, clipping means 2 is formed on the back of the recharger 1, and an adjustable supporting frame 3 is pivotally connected to the sides of the clipping means 2. A frame 22 is formed at the back of the clipping member 21 of the clipping means 2 for receiving a plate 23 whose shape is in correspondence with that of the frame 22. An arc-recess 24 is formed within a concave located at one end of the frame 22, and at an axial direction of the arc-recess 24, an axial groove 25 is formed for connecting with the supporting frame 3. A securing groove 241 for securing the position of the supporting frame 3 is formed on the periphery of the arc. The supporting frame 3 is a quadrilaterals with two ends (as shown in FIG. 3) which are a pivotal end 31 and a securing end 32 with resilience. When assembling, after the securing end 32 and the pivotal end 31 of the supporting frame 3 are inserted into the securing groove 241 and the axial groove 25 respectively, the supporting frame 3 is securely fixed. Referring to FIGS. 4 and 5, which are preferred embodiments of the present invention. With the characteristic property of the adjustable supporting frame 3, the mobile phone recharger 1 of the invention is standing on a level surface. The adjustable supporting frame 3 of the mobile phone recharger 1 is adjusted to almost parallel to the back surface of the recharger 1, therefore, the recharger 1 can be hung on a hook 5 on the wall to be used as an emergency flash light.

Although preferred embodiments have been described to illustrate the present invention, it is apparent that changes and modifications in the specifically described embodiments can be carried out without departing from the scope of the invention which is intended to be limited only by the appended claims.

What we claim is:

1. A mobile phone recharger comprising:

a battery seat on top surface;

a light source, controlled by a switch formed on one side of said recharger through connectors, which is pivotally connected to the front end of said recharger;

clipping means having an adjustable supporting frame pivotally connected to the sides;

a frame formed at the back of the clipping member of said clipping means for receiving a plate whose shape is in correspondence with that of the frame;

an arc-recess formed within a concave located at one end of said frame, and at an axial direction of the arc-recess, an axial groove for connecting with said supporting frame;

a securing groove formed on the periphery of said arc recess for securing the position of the supporting frame.

2. The mobile phone recharger as claimed in claim 1, wherein; said supporting frame is a quadrilaterals with two ends, a pivotal end and a securing end with resilience.

3. The mobile phone recharger as claimed in claim 1, wherein said pivotal end of said supporting frame is received within said axial groove.

* * * * *